United States Patent [19]

Johansson et al.

[11] 3,923,187
[45] Dec. 2, 1975

[54] WIRE BASKETS

[75] Inventors: Karl Olof Johansson; Alvar Erling Nilsson, both of Falkenberg; Hans TorBjörn Skarfelt, Habo, all of Sweden

[73] Assignee: Munksjo Aktiebolag and Pelly AB, Sweden

[22] Filed: Nov. 4, 1974

[21] Appl. No.: 520,917

[30] Foreign Application Priority Data
- June 25, 1973 Sweden.............................. 7308904
- June 25, 1973 Sweden.............................. 7308905
- Nov. 5, 1973 Sweden.............................. 7314969
- Oct. 14, 1974 Sweden.............................. 7412887

[52] U.S. Cl.................................. 220/19; 206/503
[51] Int. Cl.².......................................... B65D 7/20
[58] Field of Search ...... 220/19; 206/503, 505, 506, 206/507, 513, 515

[56] References Cited
UNITED STATES PATENTS
3,458,082  7/1969  Drader................................ 206/506

FOREIGN PATENTS OR APPLICATIONS
1,156,512  6/1969  United Kingdom

Primary Examiner—William I. Price
Assistant Examiner—Steven M. Pollard
Attorney, Agent, or Firm—Bucknam and Archer

[57] ABSTRACT

System for transportation of different articles, products, foodstuffs etc., for example in the fishing industry, for handling and conveyance both onboard fishing vessels and therefrom to fishmongers, including wire baskets stackable on top of and, especially in empty condition, nestable in each other, inserts for said wire baskets, and a cassette for storage, transportation and handling of said inserts.

8 Claims, 27 Drawing Figures

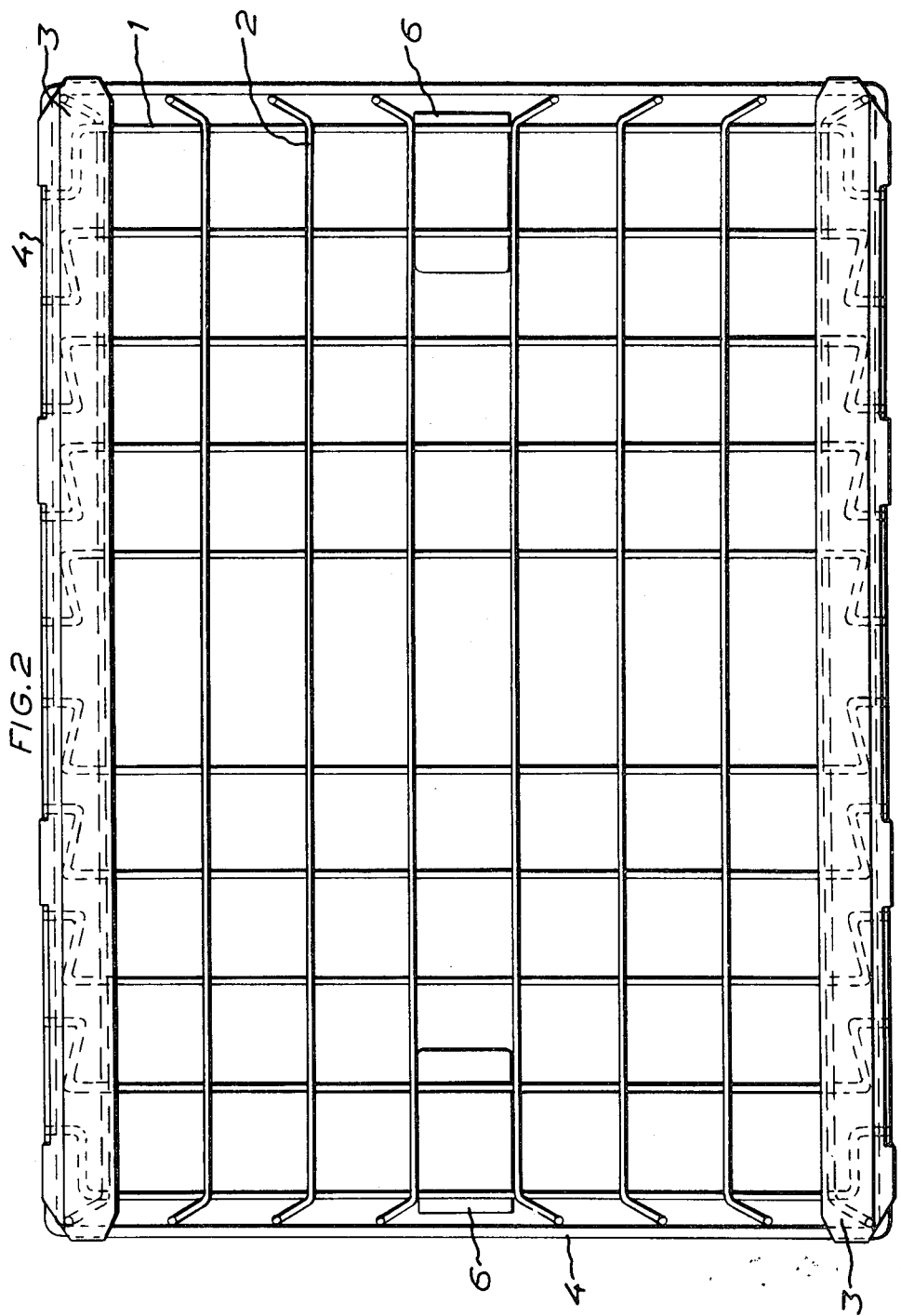

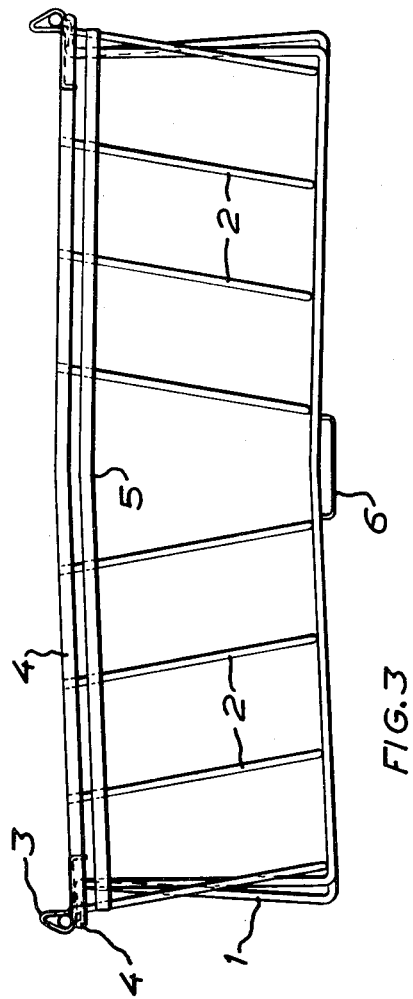

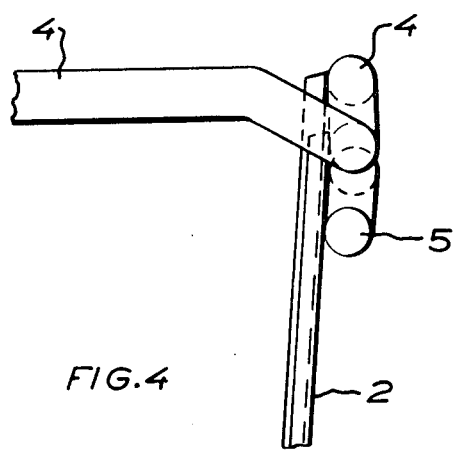
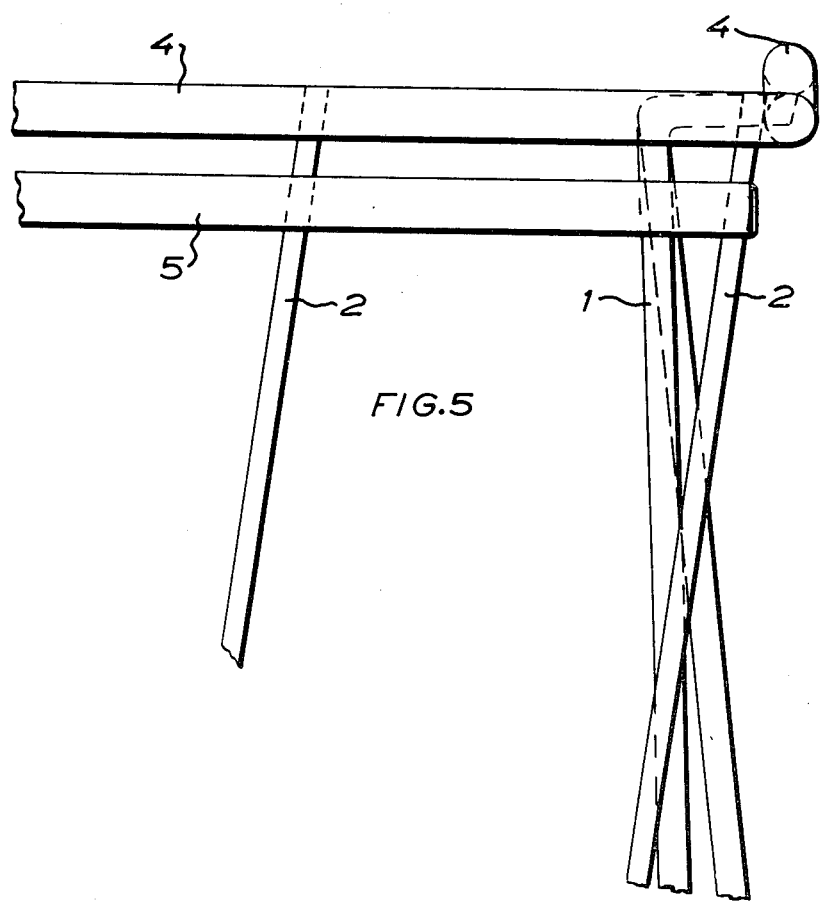

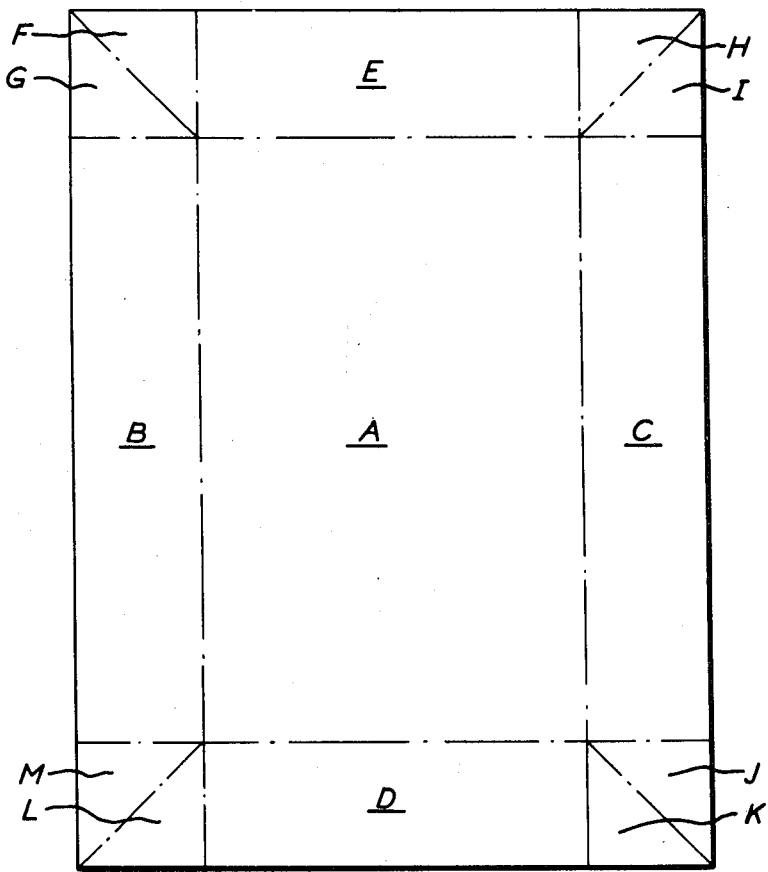

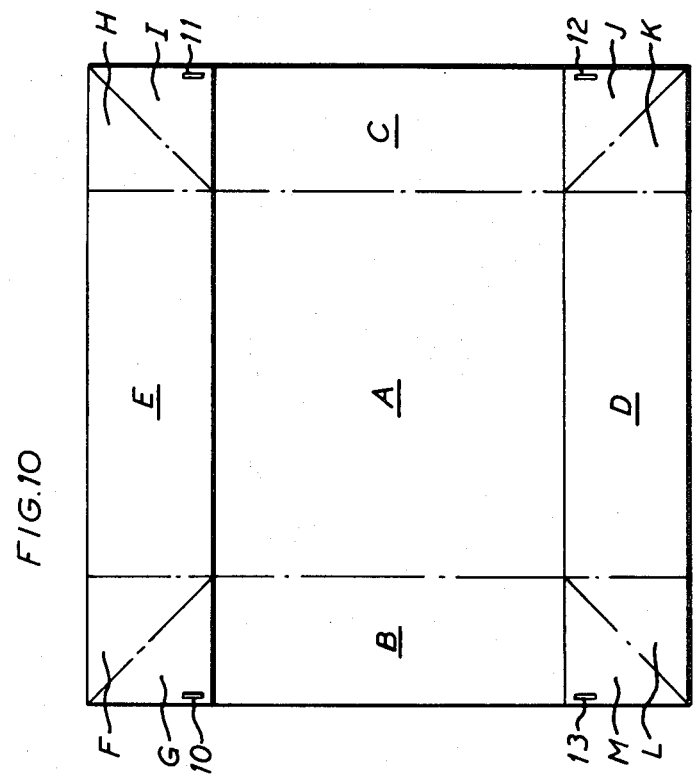
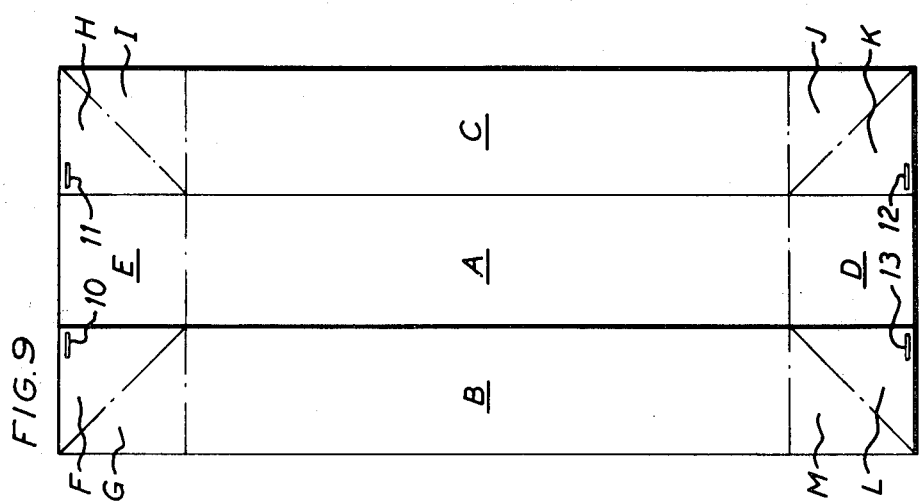

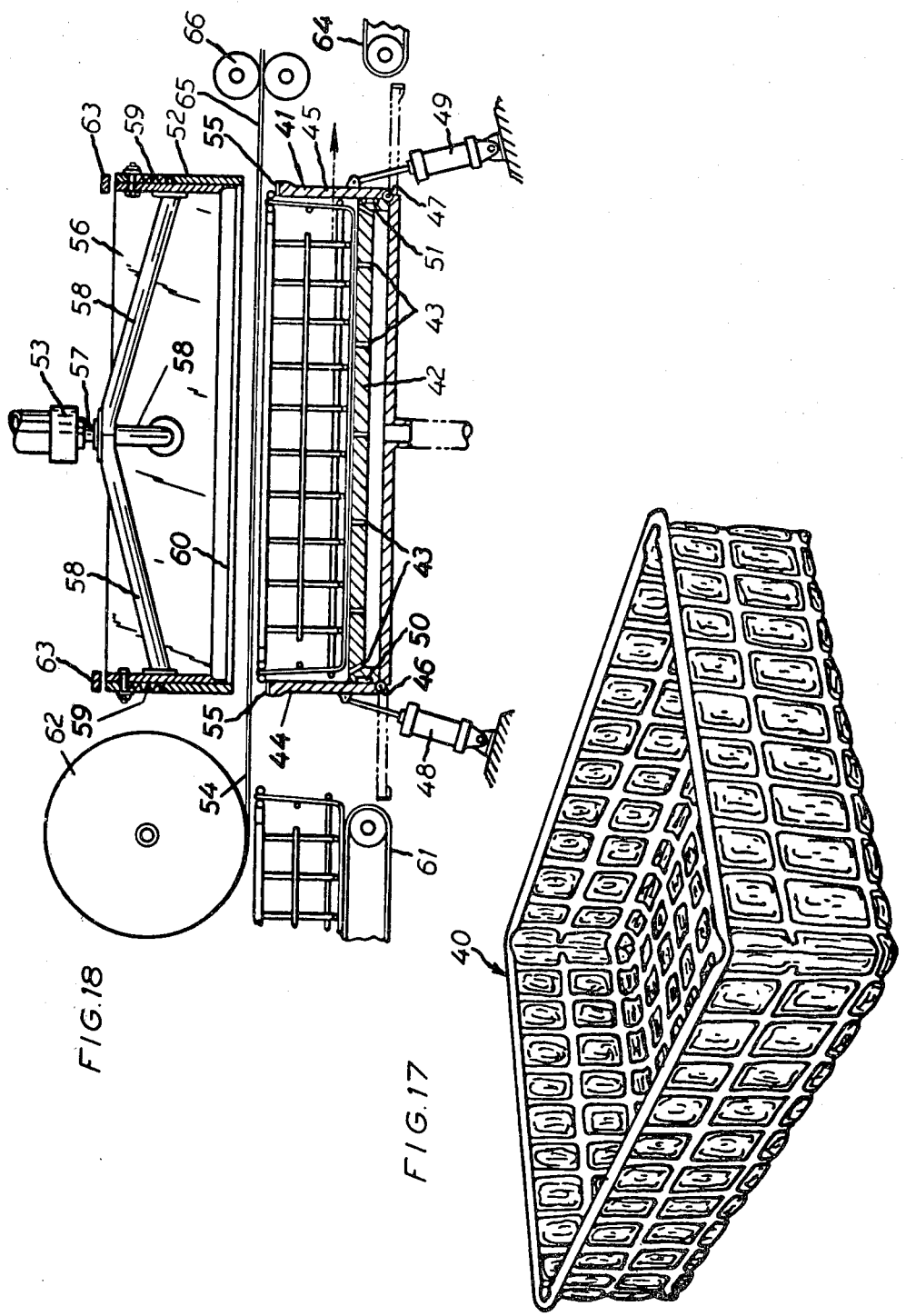

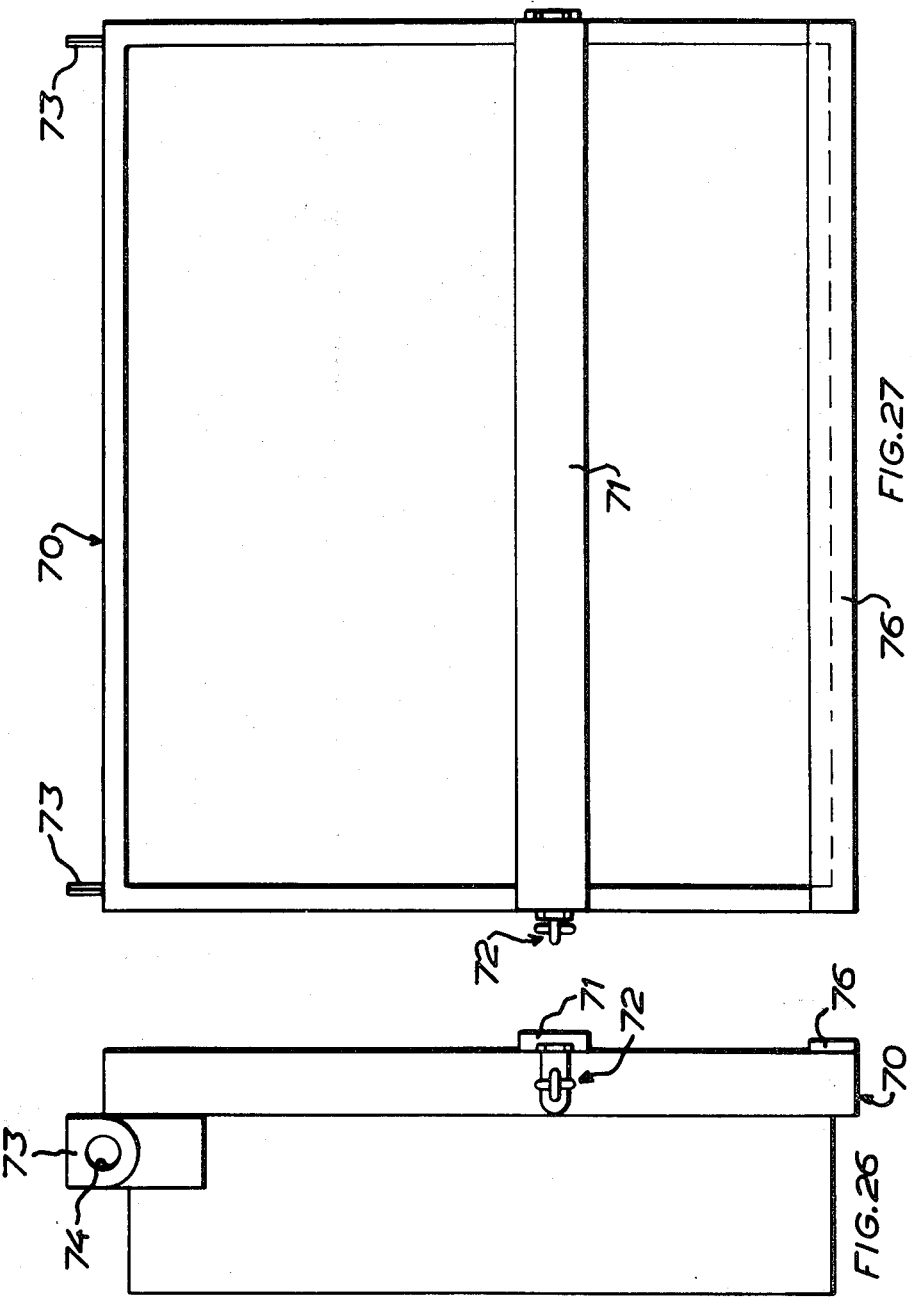

WIRE BASKETS

This invention relates to a wire basket of the type which can be stacked on top of and nested in at least one other substantially identical wire basket, an insert for the wire basket, and a cassette for such inserts.

Wire baskets of a great many different designs have been developed and are very well known. Use is made, particularly in self-service shops, of wire baskets which can be nested in each other, whereby the necessary space for storing empty, unused wire baskets is reduced to a minimum. However, these prior art designs of wire baskets do not permit two or more baskets to be stacked on top of each other. In many cases it would be extremely valuable to be able to stack wholly or partly filled baskets on top of each other to reduce the floor space required to a minimum. Moreover, it is desirable to improve the prior art designs to make it possible within a stack of predetermined height to nest as large as possible a number of empty baskets in each other, whereby the total space required for a stack of empty baskets will be reduced to a minimum.

In several branches of industry and particularly where perishables, such as fish or meat are handled, it has long been desired to be able to package and transport products in a simple and inexpensive manner without disregard of the applicable requirements for hygiene, safety of the products and other factors. It may be mentioned by way of example that fish are usually transported in wooden crates. After unpacking, such a crate has to be discarded mainly for hygienic reasons. A repeated use of the crate is highly unsuitable. It is thus desired to provide a combination of a wire basket and an insert of suitable material, the insert being of the disposable type, while the wire basket can be used many times over because it is made from a durable material and is of a construction allowing an extremely simple cleaning of the wire basket.

The handling of inserts or box blanks of a material that in conjunction with moisture will give a very smooth and slippery surface may often endanger people in the immediate vicinity. Especially on ships, for instance fishing boats or like vessels, these are most serious problems.

The problems outlined in the foregoing are overcome or at least partly eliminated by the present invention in that the wires forming the side walls of the wire basket are bent at an angle to the bottom plane of the wire basket in order that one pair of opposite side walls shall incline toward one another while the second pair of opposite side walls shall incline away from one another, that means are arranged along each of the side walls inclined toward one another, which means are adjustable between a first position in which they permit nesting of wire baskets in each other and a second position in which they permit stacking of wire baskets on top of each other, and that the insert for such a wire basket is made from a rectangular or square blank of paper, cardboard, corrugated paper, boxboard or plastic having crease lines for delimiting a bottom four sides and four corner portions each of which is divided by one or more crease lines into triangular panels which are adapted, when the insert has been erected, each to form one inwardly closed channel, or in that the insert is a sheet covering the bottom of the wire basket and extending upwardly on to the side walls thereof, said sheet bulging into the squares formed by the basket wires, and in that a cassette for the inserts comprises an at least unilaterally openable container the walls of which are continuous or grid-shaped and the openable side of which is provided with first means for retaining the blanks in the container, the lower front edge of the openable side being provided with second means for retaining the lower edges of the blanks in the container and the container being provided with third means for cooperating with some type of lifting device.

The invention will be more fully described hereinbelow and with reference to the accompanying drawings in which FIG. 1 is a side elevation of a wire basket according to the invention;

FIG. 2 is a top plan view of the wire basket in FIG. 1;

FIG. 3 is an end view of the wire basket in FIGS. 1 and 2;

FIG. 4 is a large-scale view of a detail broken out of FIG. 1;

FIG. 5 is a large-scale view of a detail broken out of FIG. 3;

FIG. 8 is a plan view of a blank in another embodiment;

FIG. 9 is another plan view of the blank in FIG. 8;

FIG. 10 is a further plan view of the blank in FIG. 8;

FIG. 17 is a perspective view of an insert according to a further embodiment of the invention;

FIG. 18 is a side elevation, partly in section, of a device for placing the insert according to FIG. 17 in a wire basket according to the invention;

FIG. 26 is a side elevation of a cassette according to the invention;

FIG. 27 is a front view of the cassette in FIG. 26.

Figure 1:
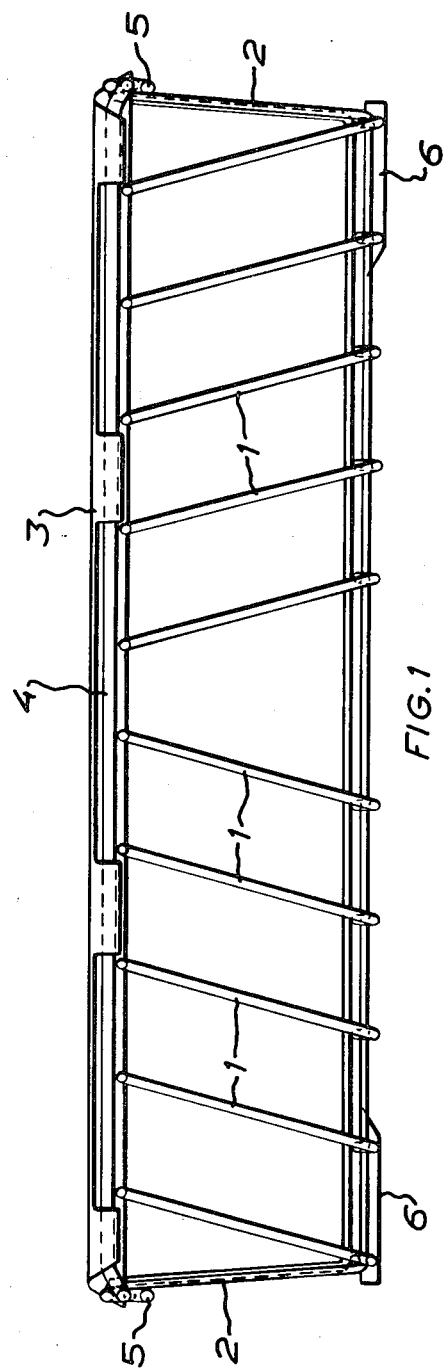

The wire basket illustrated in the drawings has a rectangular bottom and four side walls. The bottom comprises a number of spaced transverse wires 1 and a number of spaced longitudinal wires 2. The longitudinal wires 2 cross the transverse wires 1, and the wires are welded together at the crossings. The ends of all the transverse wires 1 are bent to form the longitudinal side walls of the wire basket. The two outermost transverse wires are bent at right angles to the bottom of the wire basket, whereas the other transverse wires 1 are bent at an angle smaller than 90° as seen on the inside of the wire basket. The extreme ends of the transverse wires 1 are furthermore bent outwardly from the wire basket to form supports for a carrying and sliding bar 3 which is pivotally mounted on a frame wire 4 connecting the ends of the transverse wires 1.

The ends of the longitudinal wires 2 are also bent to form the short side walls of the wire basket, and like the ends of the transverse wires 1 and the ends of the longitudinal wires 2 are connected to the frame wire 4. The connection between the frame wire 4 and the wire ends is realized by welding.

In addition to the bending of the transverse wires 1, as described above, said wires 1 in the side wall plane are bent at an angle to the bottom plane, as is illustrated more in detail in FIG. 1, the wires in one half of the side wall plane being bent towards the wires in the other half of the side wall plane. In the side wall plane formed by them, the longitudinal wires 2 are also bent at an angle to the bottom plane, the wires in one half of the side wall plane being bent away from the wires in the other half of the side wall plane, as will be seen from FIG. 3. The ends of the longitudinal wires 2 are not bent at right angles to the bottom plane but at an angle of about 5°, as is illustrated in FIG. 1. The bent ends of the longitudinal wires 2 are interconnected not only by means of the frame wire 4 but also by means of a further wire 5 which extends along the short side walls and strengthens the construction.

The angles of the wire bends in the side walls are chosen so that an optimum nesting of wire baskets in each other is obtained. In the longitudinal side walls the bending angle is preferably 15°, as is illustrated in FIG. 1, and in the transverse side walls the bending angle is preferably 10°, as is illustrated in FIG. 3.

The transverse wires 1 in the basket bottom are bent along the longitudinal center line of the wire basket, as is shown more in detail in FIG. 3. A latch means 6 is welded to the two outermost transverse wires 1 in the middle of them. It should be observed that the part of the frame wire 4 extending along the transverse side walls is bent in the same way as the transverse bottom wires 1, whereby the frame wire 4 in the center of the transverse side wall will be located on a higher level than the frame wire extending along the longitudinal side walls. If a wire basket is stacked on top of the wire basket illustrated in FIG. 3 so that it rests on the carrying and supporting bars 3 when these occupy the position illustrated in FIG. 3, the latch means 6 will be situated on a level with the central part of the frame wire 4 along the transverse side wall, thereby preventing a displacement of the wire baskets stacked on top of each other.

When it is desired to nest wire baskets in each other the carrying and sliding bar 3 is swung from the position illustrated in the figures to a position in which its carrying and sliding plane hangs down along the longitudinal side wall. With the carrying and sliding bars 3 in this position nesting of wire baskets in each other is possible.

FIGS. 4 and 5 show the edge construction of the wire basket more in detail. As the construction is clearly apparent from the two figures, it will not be necessary to enter upon a closer discussion thereof.

The dimension of the wires in the wire basket described can be chosen optionally. The transverse wires 1 need not have the same dimension as the longitudinal wires 2. The material in the wires can also be chosen optionally with regard to the intended use of the wire basket. The carrying and sliding bar 3 can also be made from an optional material, although a suitable plastic is to be preferred in most cases. A material, such as corrosion resistant steel wire, is preferable for the wire.

The wire basket described above is extremely well suited as a substitute for the earlier wooden fish crates. To this end, the wire basket should be provided with a suitable insert of paperboard or like material coated with a mixture of plastic and wax. When used as a fish crate, the wire basket according to the invention is not only a fully satisfactory substitute for conventional wooden fish crates but also involves many advantages, such as the possibility of nesting empty baskets in each other and keeping the inserts stored as planar sheets with suitable crease lines. The space required for baskets not in use will thus be very small.

A suitable insert or box, or a blank for an insert or box will be described hereinbelow with reference to FIGS. 6 to 25.

Figure 6:
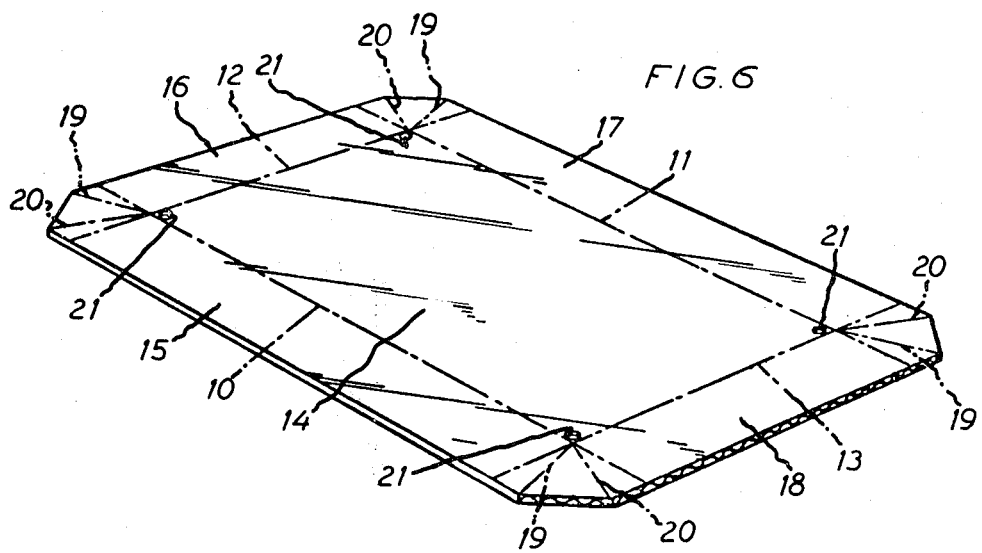
FIG. 6 is a perspective view of a blank for an insert according to the invention.

As shown in FIG. 6, a blank for a suitable insert of box can consist of a planar sheet of paperboard, corrugated paper, boxboard or any other suitable material, said sheet being divided by means of longitudinal crease lines 10, 11 and transverse crease lines 12, 13 into aa bottom panel 14 and side wall panels 15, 16, 17 and 18. The material shall preferably be treated so as to be water resistant. To this end, use can be made of a suitable mixture of plastic and wax.

The corner panels formed by the crease lines are cut and divided by means of further crease lines 19, 20 in each corner panel. A drain hole 21 is formed on the inner side of each corner of the bottom panel 14.

Figure 7:
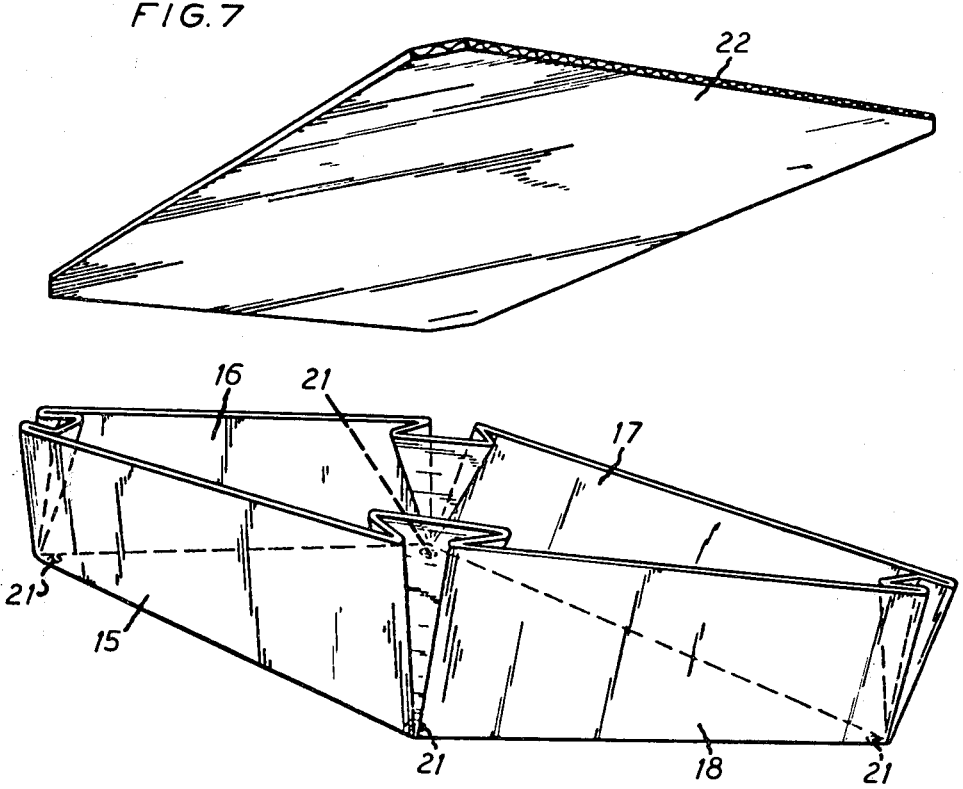
FIG. 7 is a perspective view of the blank in FIG. 6 in erected condition, and of a cover for said blank.
Figure 11:
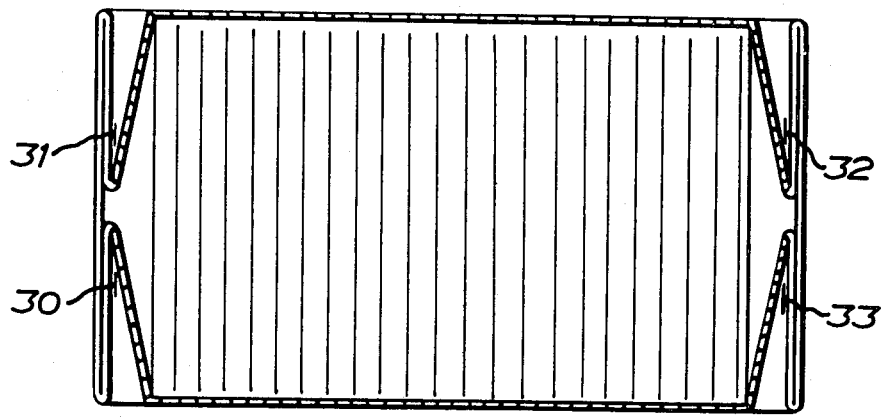
FIGS. 11, 12, 13 and 14 are views of various embodiments of the blank in FIG. 8.
Figure 12:
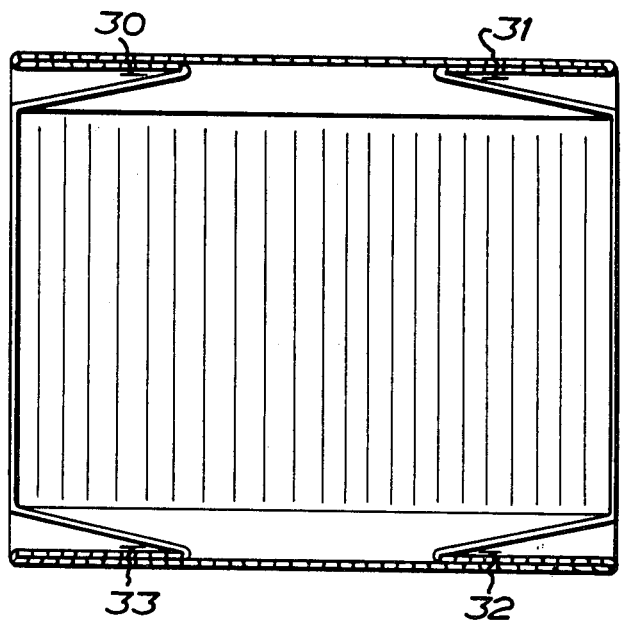
Figure 13:
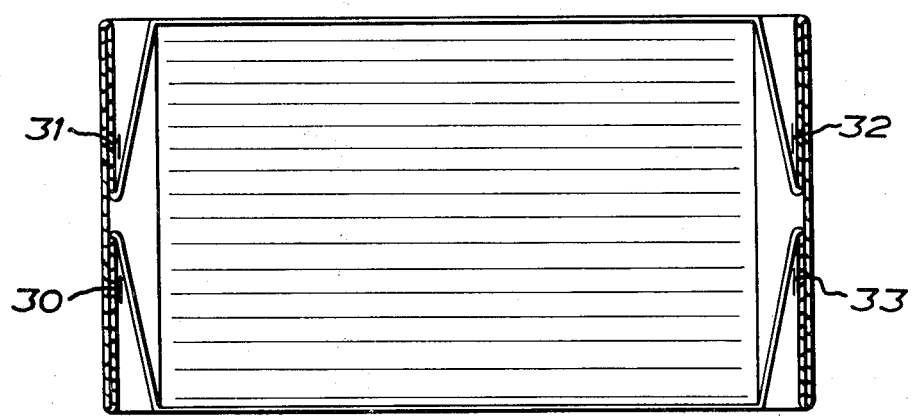

In erected condition the blank will have the shape illustrated in FIG. 7 in which also a cover 22 for the insert or box is shown.

FIGS. 8–14 show various types of a box blank to be handled with the aid of a cassette as mentioned in the foregoing. The box blank according to FIGS. 8–10 consists of a suitable material, for instance corrugated paper with a core treated with paraffin and outer sheets treated with a mixture of plastic and wax. In the different Figures crease lines are shown by dash-and-dot lines. In FIG. 9, a blank of a desired shape is divided into a bottom panel A, wall panels B, C, D and E, and corner panels F, G, H, I, J, K, L and M. Such creasing will provide a blank which is easily erected. The blank will be still more easily erected if it is pretreated in the manner shown in FIGS. 9 and 10. According to FIG. 9, the wall panels B and C and the corner panels are folded inwardly over the bottom panel A and the wall panels D and E. Furthermore, the corner panels F, H, K and L are fixed to the wall panel E and D, respectively, by staples 30, 31, 32 and 33. In this way an extremely easily erected blank is obtained, which after the product has been placed in the resulting box, is kept in erect condition by the product therein. FIG. 10 shows a blank which has been prepared in the same way and which differs from the blank in FIG. 9 merely in that the wall panels E, D and the corner panels have been folded inwardly, instead of the wall panels E, C.

FIGS. 11, 12, 13 and 14 show various embodiments of the box blank in FIG. 8. It should be noted that in these Figures the open flutings of the corrugated paper are illustrated by way of small circles, while the longitudinal extension of said flutings is illustrated by substantially straight lines. It should further be noted that the embodiment illustrated in FIG. 14 will without doubt give the maximum mechanical strength while the other embodiments can be ranged in the following order, that of FIG. 12, that of FIG. 13 and, lastly, that of FIG. 11 which has the lowest mechanical strength.

Should it be desirable to prevent penetration of water into the flutings of the corrugated paper those edges where the flutings are open may be provided with a cover strip of paper, plastic or like material, or some type of plugs of any suitable material, for instance the same type of material with which the corrugated paper is coated, can be inserted in the open flutings. The material can thus be some type of mixture of plastic and wax. It should be noted that the flutings of the corrugated paper in the embodiments according to FIGS. 12 and 13 can be covered either prior to the preparatory procedure, shown in FIGs. 12 and 13, preceding the stapling of the corner panels to the wall panels, or after said procedure. In the embodiment according to FIGS. 11 and 14, on the other hand, the flutings of the corrugated paper must be stopped prior to the last phase of the preparatory procedure.

Figure 14:
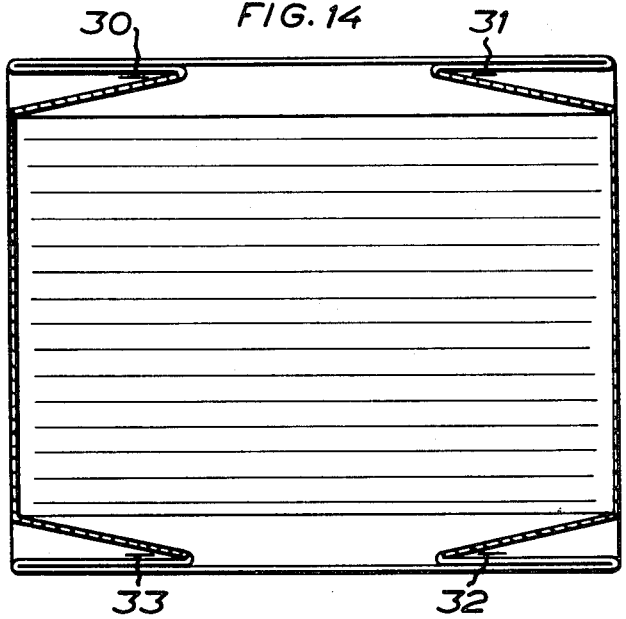
Figure 15:
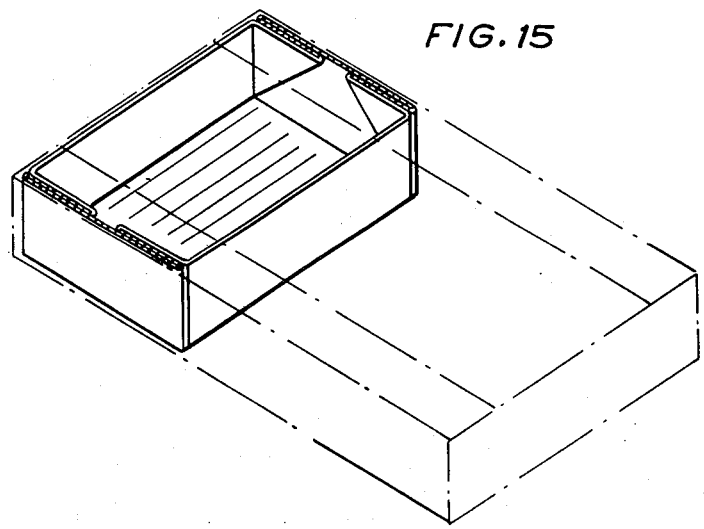
FIG. 15 is a diagrammatic perspective view of a wire basket having an insert or box made from a blank according to FIG. 8.
Figure 16:
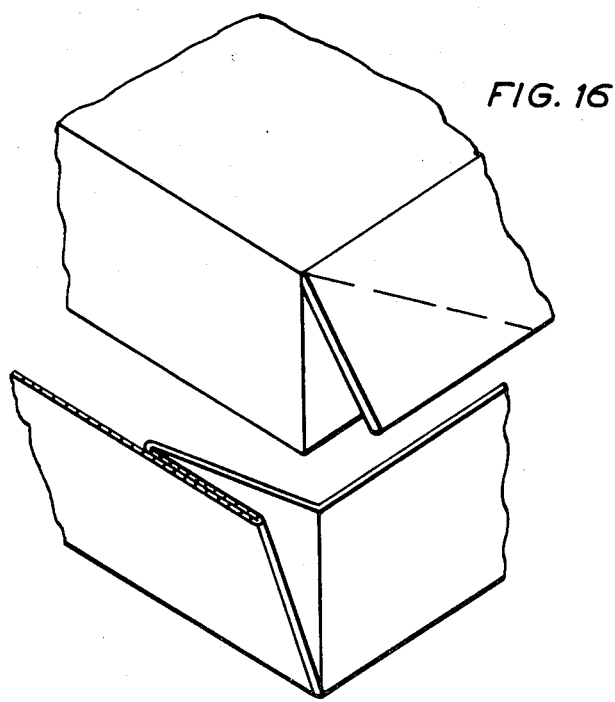
FIG. 16 is a partial perspective view of an insert or box and a cover, both made from a blank according to FIG. 8.

FIG. 15 shows a wire basket or carrier with a single erected box therein, said box having been erected from any of the blanks in the preceding Figures. FIG. 16 shows a box with a cover, both said cover and said box having been made from the blanks according to the preceding Figures. It should be observed, however, that a cover for a box of the embodiment illustrated in FIG. 13, for reasons of expediency, shall be of the design illustrated in FIG. 12 or FIG. 14.

Moreover, the insert 40 (FIG. 17) can be made from a possibly transparent sheet, preferably of plastic, which is placed in the outer part (wire basket) by straight vacuum forming, thereby being caused to cover the bottom and inner sides of the wire basket.

The vacuum forming apparatus is shown in FIG. 18 and has a chamber 41 with a bottom plate 42 provided with air flow passages 43. Two opposite sides 44, 45 of the chamber 41 are pivotally mounted, each about an axis 46 and 47, respectively, parallel with the bottom plane of the chamber. The sides 44, 45 can be pivoted by means of a piston and cylinder assembly 48 and 49, respectively, from a substantially horizontal position to a vertical position. In said vertical position the side walls 44, 45 bear against seals 50, 51, respectively, in the bottom plate 42. Corner seals (not shown) are also provided, said corners seals closing the corners of the chamber as soon as the side walls 44, 45 have been erected into vertical position. A vacuum pump or like means (not shown) is connected to the chamber 41.

Above the chamber 41 a frame 52 is vertically movable by means of a piston and cylinder assembly 53. The frame 52 is adapted to press a sheet 54 introduced between it and the chamber 41 against the edges of the chamber opening, which are preferably coated with sealing strips 55.

A knife 56 extends around the chamber 41 along the inner sides of the frame 52. It is connected to the piston 57 of the piston and cylinder assembly 53 by rigid arms 58, and the frame 52 is connected to the knife 56 via spring means 59. The edge 60 of the knife 56 is located on a somewhat higher level than the lower edge of the frame 52 in order not to cut the sheet 54 immediately when the frame 52 is lowered into engagement with said sheet.

The process of making transportation and storage containers according to the invention will now be described. In this process wire baskets are advanced on a conveyor 61 to the vacuum forming apparatus. The wall 44 is assumed to be in lowered position, and the wire basket can thus be supplied directly onto the bottom plate 42 of the chamber 41. At the same time the sheeting 54 is moved in over the chamber 41 from a supply roll 62. The wall 44 is erected by means of the piston and cylinder assembly 48, and the frame 52 is lowered into engagement with the sheeting 54, pressing it against the sealing strips 55. The evacuation is started, and the part of the sheeting 54 lying within the frame 52 is caused to conform to the inner sides of the wire basket. At a sufficiently high vacuum the sheeting 54 is caused to penetrate into the squares formed by the wires of the basket and is thus given the shape shown in FIG. 17. It may also be suitable to ressort to heating.

Once the configuration of the insert 40 has been concluded, the piston and cylinder assembly 53 by further application of force urges the knife 56 downwardly against the action of the spring means 59 to cut off the part of the sheeting 54 lying within the frame 52. After that the frame 52 and the knife 56 are raised together until stop means 63 prevent a further raising of them. The walls 44 and 45 of the chamber 41 are folded into horizontal position, and the finished container can be removed and carried away on another conveyor 64 at the same time as a new wire basket is supplied to the chamber 41. A new length of sheeting 54 is moved in over the chamber 41, this operation being facilitated by the fact that longitudinal strips 65 of the sheeting have been left by the knife 56. These strips extend between feed rollers 66.

This embodiment of the invention involves great advantages over prior art constructions. The sheet 54 constitutes an inexpensive, but also very effective insert 40. Being entirely devoid of slits as well as open or glued joints, the insert 40 is extremely well suited for the provision of completely tight packages. After containers filled with products have been transported to their destination either the inserts 40 can be discarded and the outer parts (wire baskets) returned, or the containers can be utilised for keeping the products stored. The containers are placed on racks or shelves. The use of a thin and transparent sheet contributes to an improved survey of the store so that it is readily established where and in which amounts the products are kept.

The invention is not limited to the embodiments described and illustrated but can be varied in several ways within the spirit and scope thereof. Thus, the inner part or insert 40 may be shaped in a separate vacuum forming matrix and then placed in the outer part or wire basket. The outer part in its turn may be formed with foldable side walls to make it possible to return a plurality of outer parts as a compact unit. It is also conceivable to use, instead of a straight vacuum forming means, an excess pressure forming means which is built into the frame and blows the sheeting down into the wire basket. Besides the knife need not be a mechanically cutting knife but may be a heatcutting means.

Figure 20:
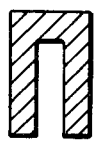
FIGS. 20, 21 and 22 are various cross-sections of the frame in FIG. 19, taken on the line I-I.
Figure 21:
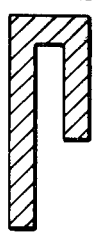
Figure 22:
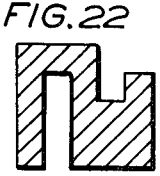
Figure 19:
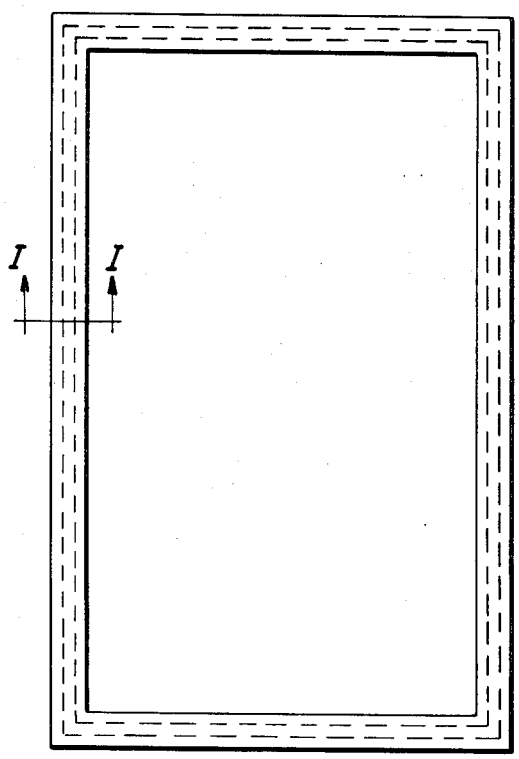
FIG. 19 is a view of a frame for a box made from a blank according to FIG. 8.
Figure 23:
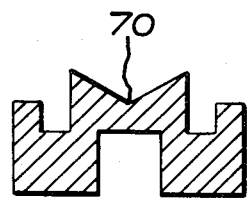
FIG. 23 is a cross-section of a frame according to FIG. 19, which is provided with a central portion when the frame is intended for two different inserts or boxes.
Figure 25:
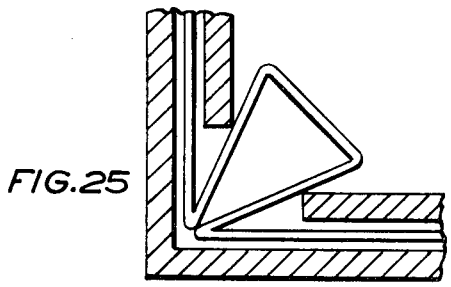
FIG. 25 is a partial section similar to FIG. 24 but with a blank according to another embodiment.
Figure 24:
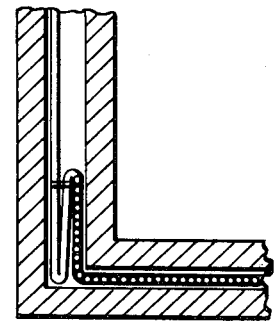
FIG. 24 is a partial section of a corner of a box having a frame according to FIG. 19.

To make sure that the erected box (FIGS. 6–14) remains in erected position a frame of the type shown in FIG. 10 can be provided. This frame may be made from any suitable material, for instance a plastic material of suitable hardness. The frame may have various cross-sections, and FIGS. 20–22 show some such cross-sections of the frame on the line I—I. The cross-section of FIG. 22 is especially well suited if the frame is to be combined with a cover. It should be noted that the upwardly facing channel is provided with drain holes for conducting away water from the box. If the frame is to be used for a construction in which a wire basket is provided with two boxes (FIG. 14 shows a wire basket with one of the two boxes) of the type earlier described, the frame can be equipped with a central portion of the cross-section illustrated in FIG. 23. In that case there shall be provided at 70 a weakening line, either continuous or discontinuous, whereby a division of the frame in FIG. 19 is facilitated when the two boxes are to be brought apart. FIGS. 24 and 25 illustrate more in detail how the frame in FIG. 19 will keep the box in erected condition by locking of the corner structures.

The present invention may suitably be combined with a device by which boxes arranged in a wire basket can be lifted out of the wire basket, or by which the wire basket can be lowered, which in principle means that the boxes are removed from the basket. Such a device serves to facilitate the handling of the boxes and the provision of some type of cover on the boxes. The device may comprise a number of uprights which are passed through the squares of the wire basket. The device may be arranged at a table, conveyor belt or like means and may be hydraulic or pneumatic.

FIGS. 26 and 27 show a cassette according to the present invention intended for the storage of one or more bundles of box blanks which are wrapped in plastic or like material, and which may be of various constructions, preference being, however, given to the blanks described in the foregoing with regard to FIGS. 6–14. In the present instance, the cassette shown in FIGS. 26 and 27 is an upright wooden box without cover. Naturally, the cassette need not be of wood but can be of any suitable material, for instance wire netting or like material. To cause the cassette to occupy an inclined position it is provided with a frame 70, and in order that the blanks in said cassette shall not fall out of it, the cover of the cassette has been replaced by a transverse member 71 which is pivoted to the cassette or frame 70 at its one end and can be anchored to the frame or cassette 70 at its other end, as shown at 73. Furthermore, the cassette is provided with lifting lugs 73 arranged to receive a tubular arm which is insertable in holes 74 in the lugs 73 and which can be arranged for pivotment, while the cassette can be movable longitudinally of the arm. A strip 76 is provided at the lower edge of the front part of the cassette to prevent blanks in said cassette from sliding out of it. The strip 76 and the transverse member 72 may of course be made as an integral unit, thereby forming a half-cover on the cassette. Moreover, the cassette may of course be entirely closable by having a two-part cover, one part of said cover being foldable downwardly over a lower part. With the use of a cassette of the type shown in FIGS. 26 and 27 the handling of box blanks is considerably facilitated, particularly in narrow and difficult places, for instance on board ships, especially fishing boats and like vessels, on which the box blanks shall be erected and filled with fish and ice and possibly also placed in a suitable type of carrier, such as a wire basket. The cassette can also be provided with a bottom which is urged upwardly by springs or like means so that the box blanks are pressed against the transverse member 72 by said spring-actuated bottom. This will further facilitate the handling of the box blanks.

To facilitate handling, counting and lifting of nested empty wire baskets according to the foregoing specificiation there is suggested according to the present invention an apparatus which permits gripping a stack of wire baskets containing a predetermined number of such baskets and which ensures a safe handling or lifting of such a stack of wire baskets.

Said apparatus preferably comprises two individual components, each having the configuration of an elongate body of for instance plastic, wire or sheet metal, the ends of said body being adapted to engage or grasp the uppermost and lowermost wire baskets in a stack. The distance between the ends of said body shall thus correspond to the distance between the uppermost and lowermost wire baskets in a stack containing the desired number of wire baskets to be incorporated in each stack.

One end of said body shall grasp the frame of the uppermost wire basket, and either the other end of said body shall grasp the frame of the lowermost wire basket or the body shall be of such a length that said other end can extend in beneath the bottom of the lowermost wire basket.

A stack of wire baskets thus has such a component on the outer side of two opposite walls, preferably the end walls. The two components may be provided with means for cooperation with lifting means or the like of a lifting device. To simplify the mounting of the components the body may be bent to permit being extended under elastic deformation, or be telescopic in some other manner. Moreover, the body may be formed with holes or indexes for indicating the number of wire baskets in said stack.

What we claim and desire to secure by letters Patent is:

1. A wire basket intended for stacking on top of and nesting in at least one other substantially identical wire basket, wherein wires forming side walls of said wire basket are bent at an angle to a bottom plane of said wire basket in order that one pair of opposite side walls shall incline toward one another while the second pair of opposite side walls shall incline away from one another, and means are arranged along each of the side walls inclined toward one another, which means are adjustable between a first position in which they permit nesting of wire baskets in each other and a second position in which they permit stacking of wire baskets on top of each other.

2. A wire basket as claimed in claim 1, wherein said wires forming said side walls are inclined also in the planes of said side walls to said bottom plane of said wire basket.

3. A wire basket as claimed in claim 2, wherein as viewed from the centre and outwardly toward the ends of the mutually inclining side wall planes said wires in said side walls are bent toward each other relative to said bottom plane, and as viewed from the centre and upwardly toward the ends of said mutually inclining side wall planes said wires in said side walls are bent away from each other relative to the bottom plane.

4. A wire basket as claimed in claim 2, wherein the upper end portions of said wires in said mutually inclining side walls are bent outwardly from said wire basket to a plane substantially in parallel with said bottom plane.

5. A wire basket as claimed in claim 1, wherein a frame means interconnects the ends of said wires forming said side walls.

6. A wire basket as claimed in claim 1, wherein said adjustable means are bars which are pivotally mounted on the frame means interconnecting the ends of said wires in said mutually inclining side walls.

7. A wire basket as claimed in claim 1, wherein said wires in said side walls are continuous with said wires in said bottom, and said wires in said opposite side walls cross each other in said bottom.

8. A wire basket as claimed in claim 1, wherein said bottom plane is bent along at least one line between said mutually inclining side walls so that bottom plane portions formed by the bending are inclined from said line outwardly toward said side walls, and frame means along said side walls inclining away from one another are bent substantially at the same angle as said bottom plane.

* * * * *